(12) United States Patent
Wang

(10) Patent No.: US 7,594,816 B1
(45) Date of Patent: Sep. 29, 2009

(54) FEMALE CONNECTOR MEMBER FOR TOWING CONNECTOR

(76) Inventor: Jen-Ching Wang, No. 14-1, Lane 199, San Chun Street, Shu Lin City, Taipei Hsien (TW)

( * ) Notice: Subject to any disclaimer, the term of this patent is extended or adjusted under 35 U.S.C. 154(b) by 0 days.

(21) Appl. No.: 12/237,996

(22) Filed: Sep. 25, 2008

Related U.S. Application Data

(63) Continuation-in-part of application No. 11/797,099, filed on Apr. 30, 2007.

(51) Int. Cl.
*H01R 33/00* (2006.01)
(52) U.S. Cl. .................................................... 439/35
(58) Field of Classification Search .................. 439/35, 439/489, 490, 340
See application file for complete search history.

(56) References Cited

U.S. PATENT DOCUMENTS

| | | | | |
|---|---|---|---|---|
| 4,127,855 A * | 11/1978 | Toner | ..................... | 340/687 |
| 4,278,962 A * | 7/1981 | Lin | ..................... | 340/904 |
| 4,390,226 A * | 6/1983 | Hohn | ..................... | 439/261 |
| 4,781,393 A * | 11/1988 | Jeter | ..................... | 307/10.1 |
| 4,945,346 A * | 7/1990 | Schmiemann | ............... | 340/656 |
| 5,281,147 A * | 1/1994 | Hughes | ..................... | 439/35 |
| 5,514,009 A * | 5/1996 | Hughes | ..................... | 439/35 |
| 5,765,848 A * | 6/1998 | Silvey | ..................... | 280/422 |
| 6,054,779 A * | 4/2000 | Zubko | ..................... | 307/10.8 |
| 6,064,299 A * | 5/2000 | Lesesky et al. | .............. | 340/431 |
| 6,305,945 B1* | 10/2001 | Vance | ..................... | 439/35 |
| 6,329,927 B1* | 12/2001 | Hobson | ................. | 340/815.69 |
| 6,364,681 B1* | 4/2002 | Watanabe | ................. | 439/335 |
| 6,390,824 B1* | 5/2002 | Vance | ..................... | 439/35 |
| 6,422,884 B1* | 7/2002 | Babasick et al. | ............ | 439/222 |
| 6,447,302 B1* | 9/2002 | Davis | ..................... | 439/34 |
| 6,475,036 B2* | 11/2002 | Morikawa | ................. | 439/716 |
| D468,691 S * | 1/2003 | Detter et al. | ............... | D13/133 |
| 6,535,113 B1* | 3/2003 | Gravolin | ................. | 340/431 |
| 6,642,628 B2* | 11/2003 | Burdick et al. | ............... | 307/9.1 |
| 6,657,435 B2* | 12/2003 | Brown | ..................... | 324/508 |
| 6,695,621 B1* | 2/2004 | Wang | ..................... | 439/35 |
| 6,709,275 B1* | 3/2004 | Ihde | ..................... | 439/35 |
| 6,749,438 B1* | 6/2004 | Scheller et al. | ............... | 439/35 |
| 6,788,190 B2* | 9/2004 | Bishop | ..................... | 340/435 |
| 6,980,096 B1* | 12/2005 | Washington et al. | ........ | 340/431 |
| 7,118,379 B1* | 10/2006 | Wang | ..................... | 439/35 |
| 7,214,094 B2* | 5/2007 | Kaminski et al. | ........... | 439/550 |
| 7,324,013 B2* | 1/2008 | Esson | ..................... | 340/903 |
| 7,331,792 B2* | 2/2008 | Cummings et al. | ............ | 439/35 |
| 2002/0004343 A1* | 1/2002 | Morikawa | ................. | 439/716 |
| 2002/0075622 A1* | 6/2002 | Robinson | ................. | 361/117 |
| 2002/0125771 A1* | 9/2002 | Kaminski | ................. | 307/10.1 |
| 2005/0037632 A1* | 2/2005 | Ihde | ..................... | 439/35 |
| 2007/0171031 A1* | 7/2007 | Hastings | ................. | 340/431 |
| 2007/0202711 A1* | 8/2007 | Dilgard | ................. | 439/35 |

* cited by examiner

*Primary Examiner*—Hae Moon Hyeon
*Assistant Examiner*—Vladimir Imas
(74) *Attorney, Agent, or Firm*—Muncy, Geissler, Olds & Lowe, PLLC

(57) ABSTRACT

A female connector member for a towing connector includes a buzzer mounted in an accommodation chamber of a connector body and electrically connected to the reverse light terminal and grounding terminal to give an audio warning signal when the towing vehicle is moving backwards. A light emitting diode (LED) circuit board is mounted in the accommodation chamber and is electrically coupled to the buzzer for controlling LEDs to flash when the buzzer buzzes.

3 Claims, 8 Drawing Sheets

FEMALE CONNECTOR MEMBER FOR TOWING CONNECTOR

CROSS-REFERENCE TO RELATED APPLICATION

The present invention is a continuation-in-part of U.S. Ser. No. 11/797,099, filed Apr. 30, 2007, entitled "Parking Alarm of a Towing Connector".

BACKGROUND OF THE INVENTION

1. Field of the Invention

The present invention relates to a towing connector and more particularly, to a female connector member for towing connector, which has a buzzer and a light emitting diode (LED) circuit board mounted in an accommodation chamber of the connector body thereof and electrically connected to the reversing light terminal and grounding terminal so that the buzzer gives an audio warning signal and the LED circuit board gives a visual warning signal when the towing vehicle is moving backwards.

2. Description of the Related Art

A female connector member for towing connector is known having a plurality of electric wires for connection to the left directional light, right directional light, license light (tail light), stop light, 12V car battery and reversing light of a towing vehicle. When the towing vehicle is moving backwards, the reversing light will be turned on to give a visual warning signal. However, this visual warning signal may be not seen in a particular angle.

SUMMARY OF THE INVENTION

The present invention has been accomplished under the circumstances in view. It is therefore one object of the present invention to provide a female connector member for towing connector, which gives an audio warning signal as well as a visual warning signal when the towing vehicle is moving backwards.

According to one aspect of the present invention, the female connector member comprises a buzzer mounted in an accommodation chamber of the connector body thereof and electrically connected to the reverse light terminal and grounding terminal for giving an audio warning signal when the towing vehicle is moving backwards.

According to another aspect of the present invention, a LED circuit board is mounted in the accommodation chamber above the buzzer and electrically coupled to the buzzer for controlling a number of LEDs to flash when the buzzer buzzes.

DETAILED DESCRIPTION OF THE INVENTION

Figure 1:
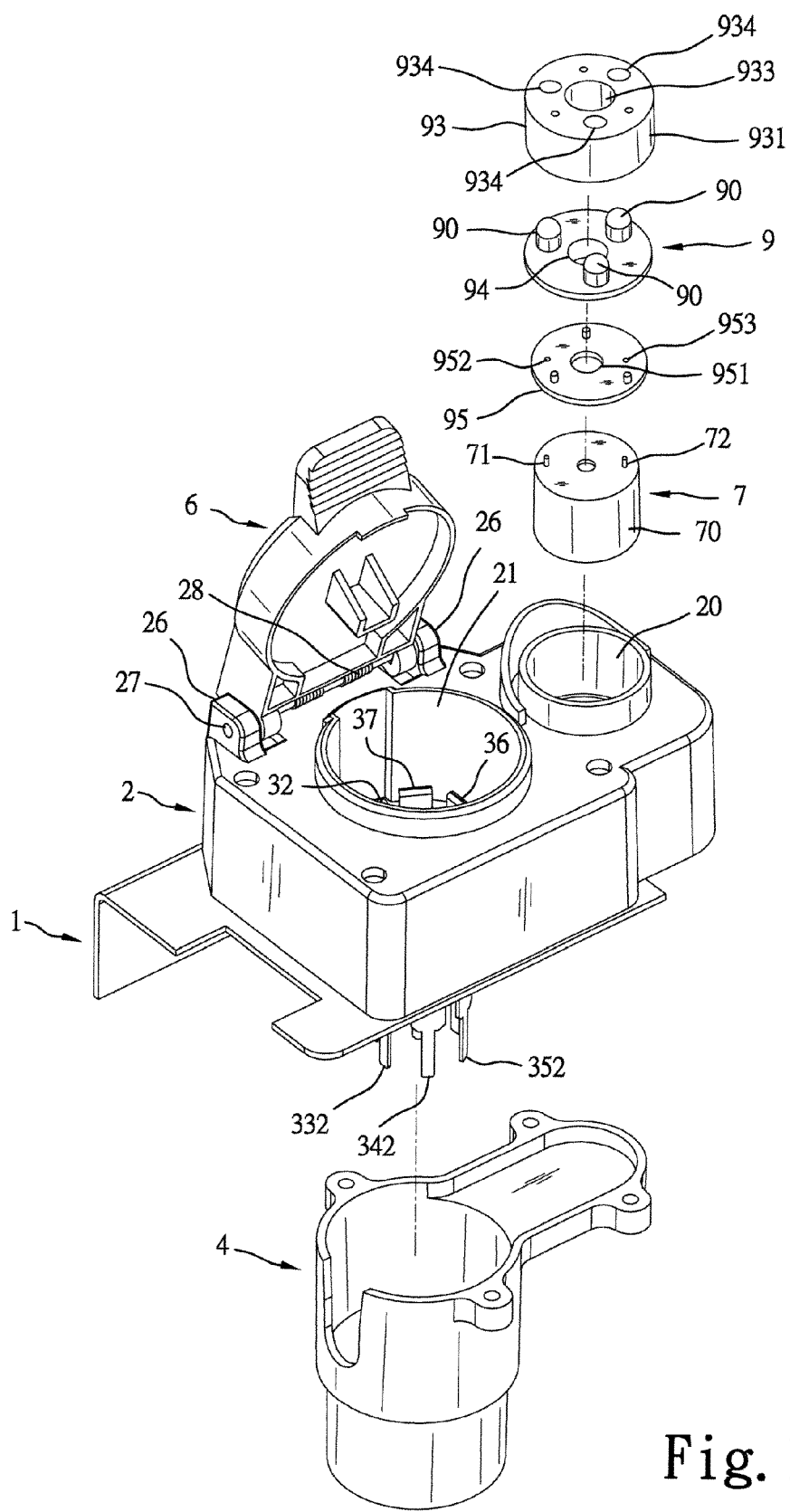
FIG. 1 is an exploded view of a female connector member for towing connector according to the present invention.
Figure 2:
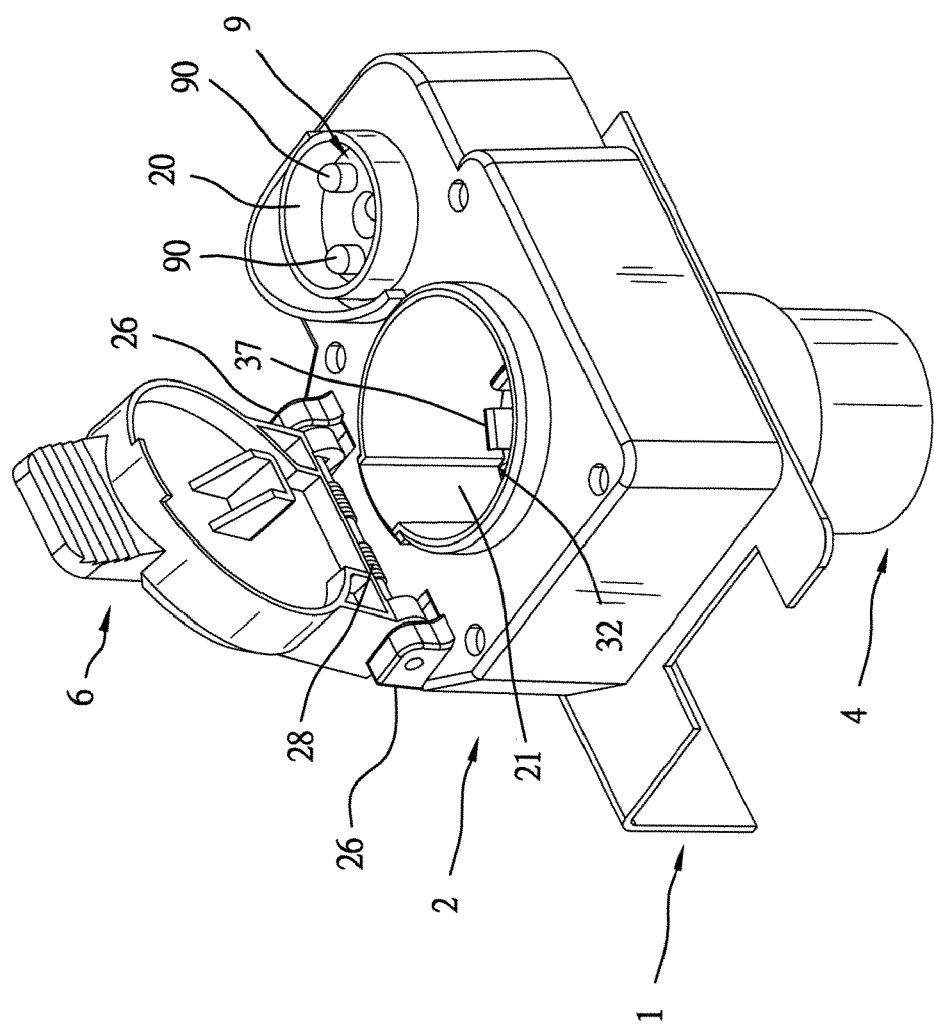
FIG. 2 is an elevational assembly view of the female connector member for towing connector according to the present invention, showing the front cover opened.
Figure 3:
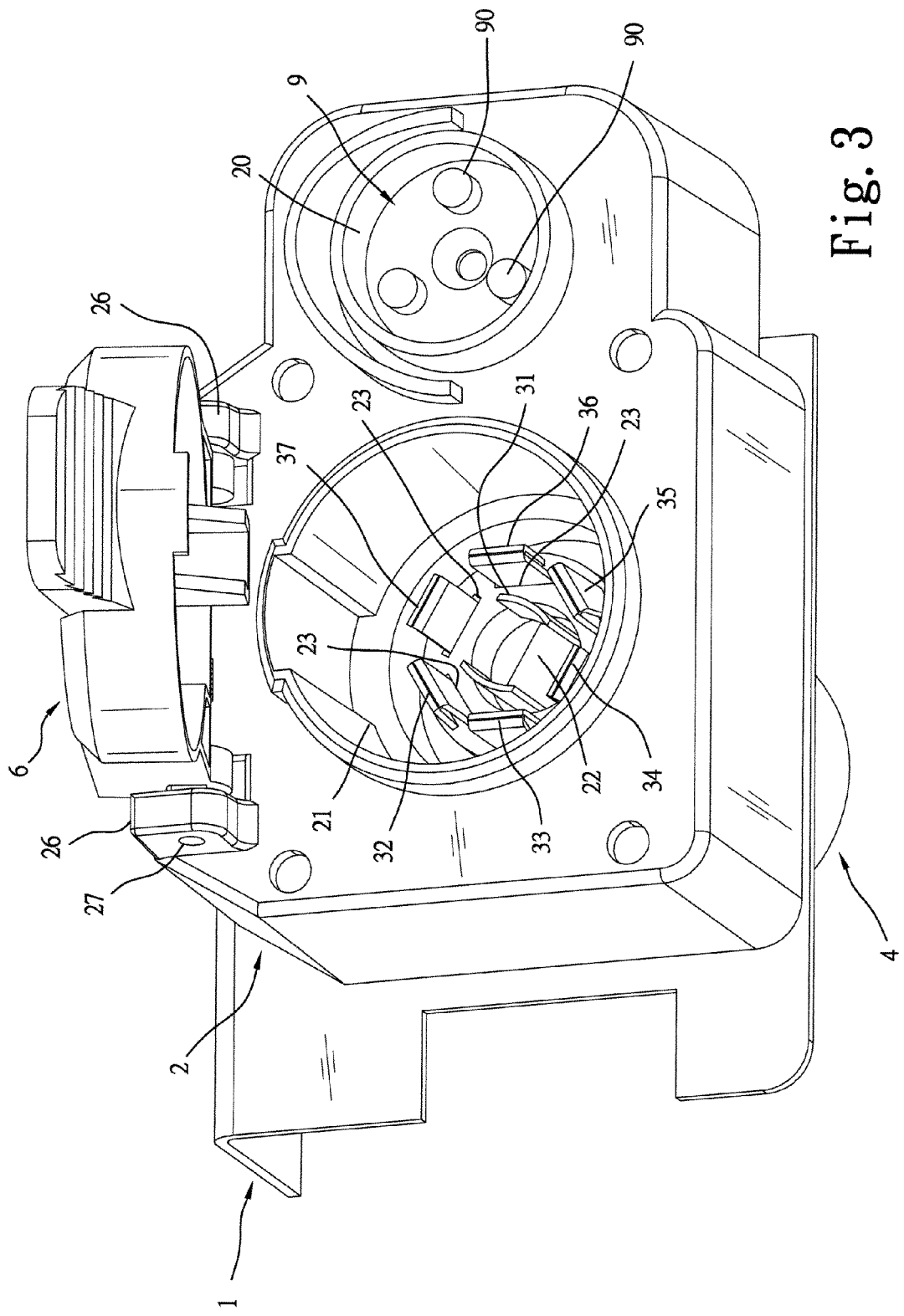
FIG. 3 is an enlarged scale of FIG. 2 when viewed from another angle.
Figure 4:
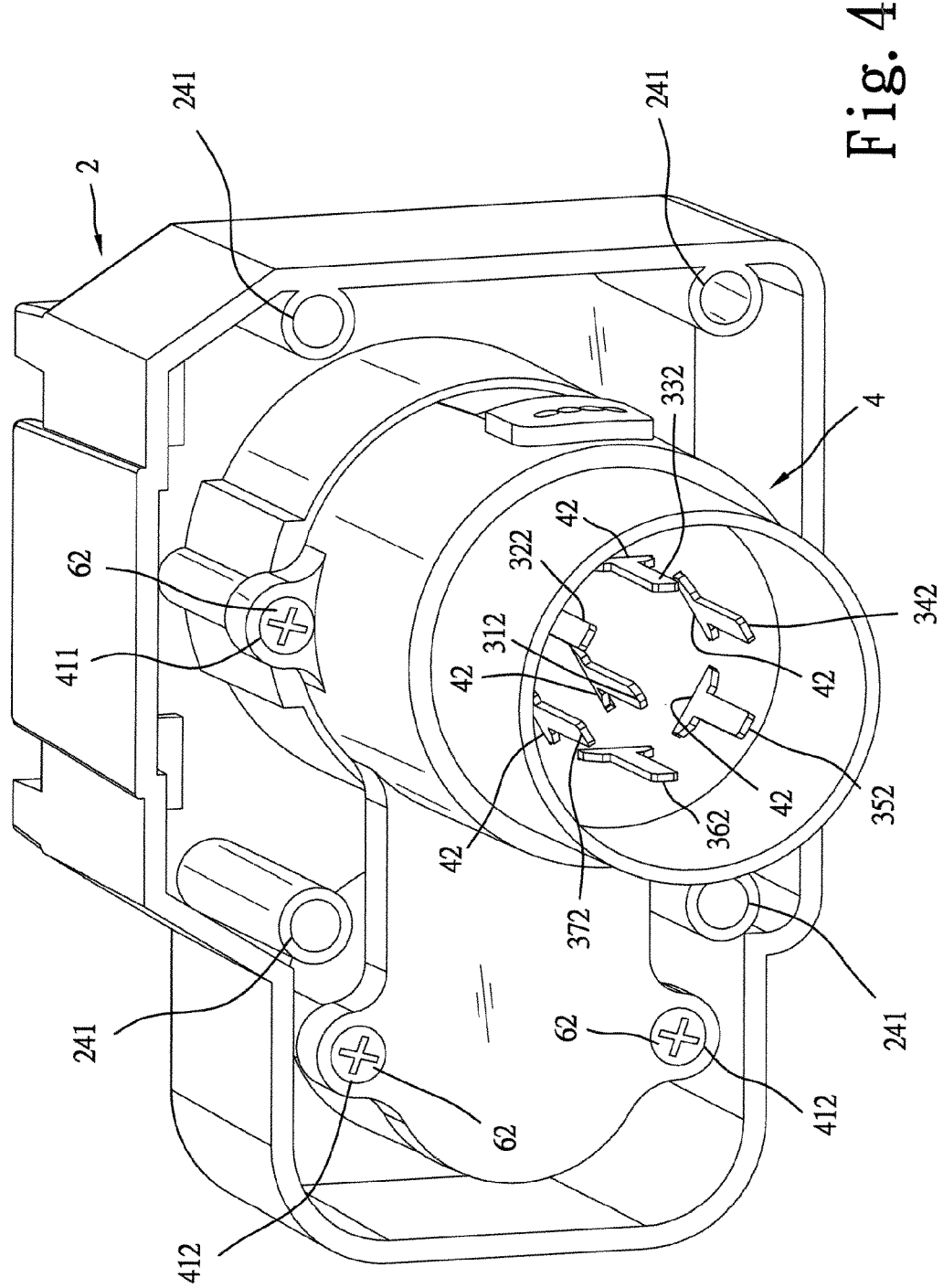
FIG. 4 is an oblique bottom view in an enlarged scale of the female connector member for towing connector according to the present invention.
Figure 5:
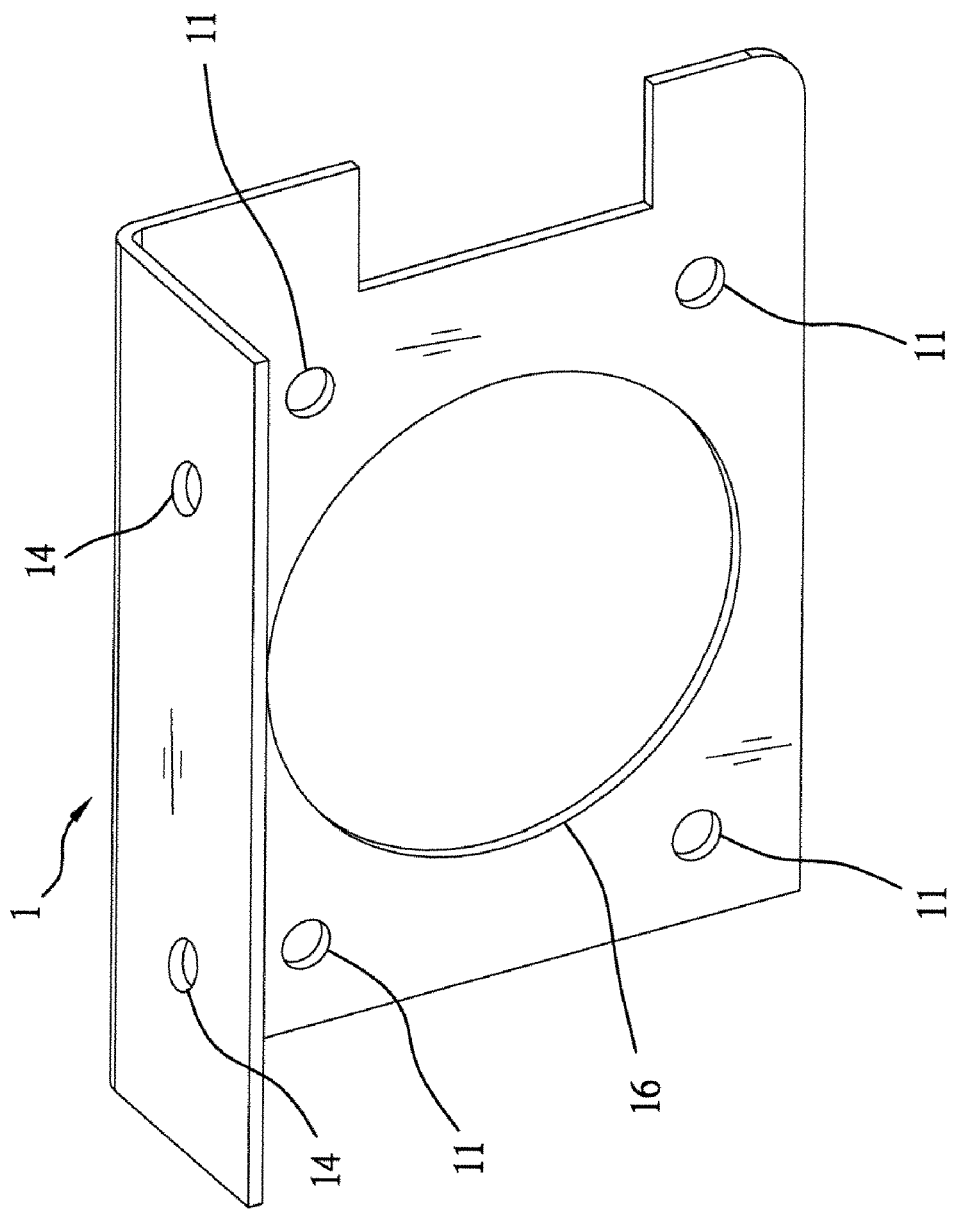
FIG. 5 is an elevational view of the bracket of the female connector member for towing connector according to the present invention.
Figure 6:
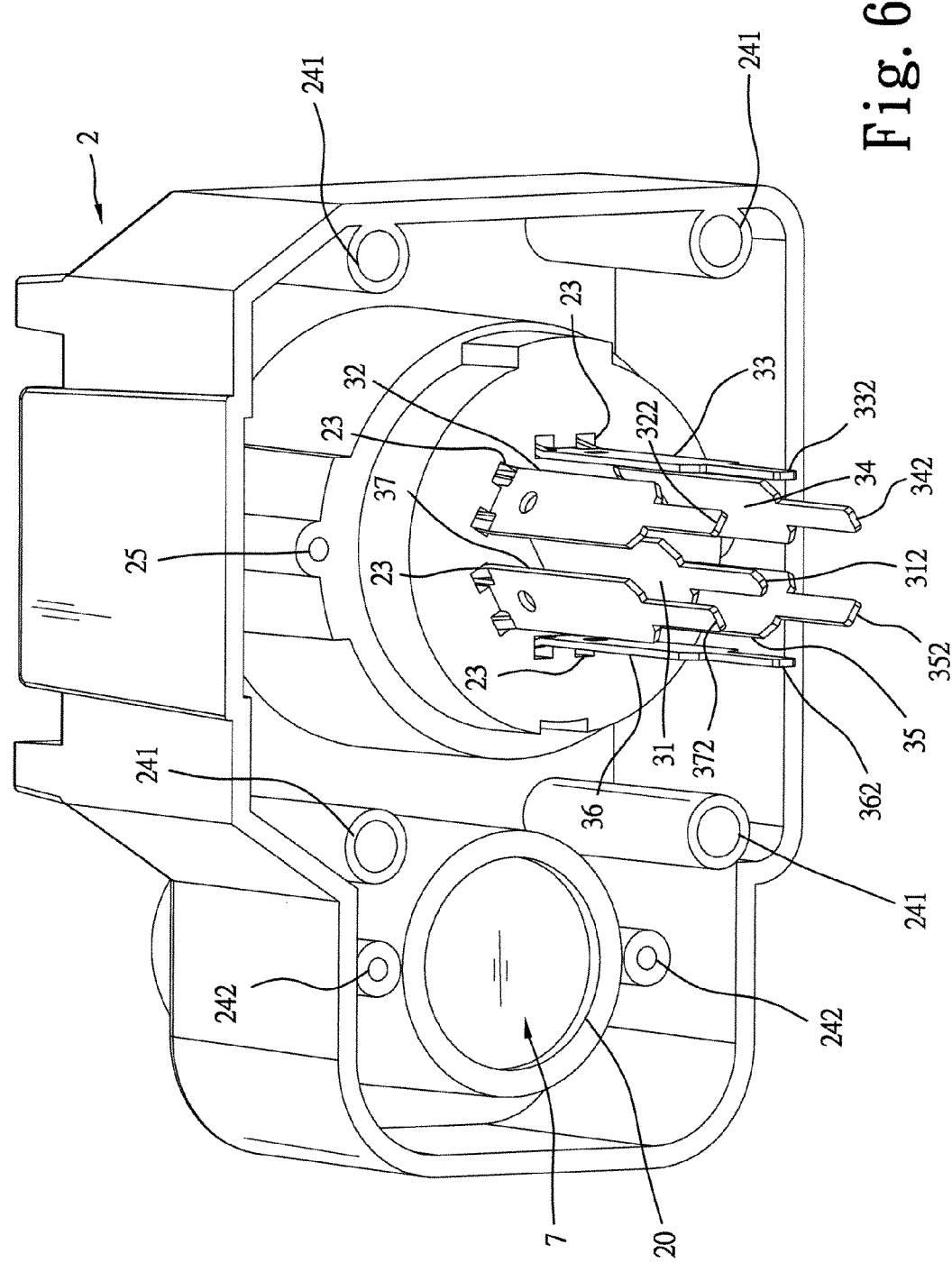
FIG. 6 is an oblique bottom view in an enlarged scale of the female connector member for towing connector according to the present invention before installation of the bracket and the back cover.

Referring to FIGS. 1~8, a in accordance with the present invention female connector member for towing connector is shown comprising a bracket 1, a connector body 2, a back cover 4, and a front cover 6.

The bracket 1 (see FIG. 5) comprises an opening 16, a plurality of first mounting through holes 11 for the mounting of the connector body 2, and a plurality of second mounting through holes 14 for fastening to the rear bottom side of the vehicle (not shown) by fastening members.

The connector body 2 is fixedly fastened to the first mounting through holes 11 of the bracket 1, comprising a plug hole 21 for the connection of a male connector member for towing connector, and a plurality of insertion holes 22 and 23 in communication with the plug hole 21 (see FIG. 3) The center insertion hole 22 is adapted for receiving a reverse light terminal 31. The other insertion holes 23 are adapted for receiving a taillight terminal 32, a left turn signal light terminal 33, a grounding terminal 34, a stoplight terminal 35, a right turn signal light terminal 36 and a battery terminal 37 respectively. Further, the top ends (see FIG. 2) and bottom ends 312, 322, 332, 342, 352, 362 and 372 of the terminals 31, 32, 34, 35, 36 and 37 (see FIG. 6) respectively protrude over the top and bottom sides of the respective insertion holes 22 and 23. Further, the bottom ends 312, 322, 332, 342, 352, 352 and 372 of the terminals 31, 32, 33, 34, 35, 36 and 37 respectively extend through the back cover 4 and respectively electrically connected to respective lead wires 5 (see FIG. 8) that are respectively electrically connected to the reverse light (not shown), taillight (not shown), left turn signal light (not shown), grounding circuit (not shown), stoplight (not shown), right turn signal light (not shown) and 12V car battery charger (not shown) of the vehicle (not shown). The connector body 2 further comprises a plurality of mounting holes 241 respectively fastened to the mounting through holes 11 of the bracket 1, and a plurality of mounting through holes 242 and 25 respectively fastened to the back cover 4 with respective fastening members 62 (see FIG. 4). The connector body 2 further comprises a pair of upright lugs 26 for supporting the front cover 6.

The back cover 4 comprises a plurality of mounting holes 411 and 412 respectively fastened to the mounting through holes 242 and 25 of the connector body 2 by the respective fastening members 62 (see FIG. 4), and a plurality of insertion holes 42 for the passing of the bottom ends 312, 322, 332, 342, 352, 362 and 372 of the terminals 31, 32, 33, 34, 35, 36 and 37 respectively.

The front cover 6 is pivotally connected to the upright lugs 26 of the connector body 2 by a pivot pin 27. Further, a torsional spring 28 is mounted on the pivot pin 27 to impart a biasing force to the front cover 6 relative to the connector body 2.

By means of the second mounting through holes 14 of the bracket 1, female connector member for towing connector can be conveniently fastened to the rear bottom side of the vehicle (not shown) by fastening members. After fixation of the bracket 1 of the female connector member for towing connector to the rear bottom side of the vehicle (not shown), the bottom ends 312, 322, 332, 342, 352, 362 and 372 of the terminals 31, 32, 33, 34, 35, 36 and 37 are respectively electrically connected to the lead wires 5 (see FIG. 8) of the reverse light (not shown), taillight (not shown), left turn signal light (not shown), grounding circuit (not shown), stoplight (not shown), right turn signal light (not shown) and 12V car battery charger (not shown) of the vehicle (not shown).

The main features of the present invention are outlined hereinafter. The connector body 2 further comprises an accommodation chamber 20 that houses a buzzer 7. The buzzer 7 has a positive terminal 71 and a negative terminal 72 respectively electrically connected to the bottom end 312 of the reverse light terminal 31 and the bottom end 342 of the grounding terminal 34 by lead wires 81 and 82 respectively (see FIG. 6). Therefore, when the vehicle is reversing, the reverse light of the vehicle is turned on to give a visual warning signal, and at the same time the buzzer 7 is driven to give an audio warning signal.

Figure 7:
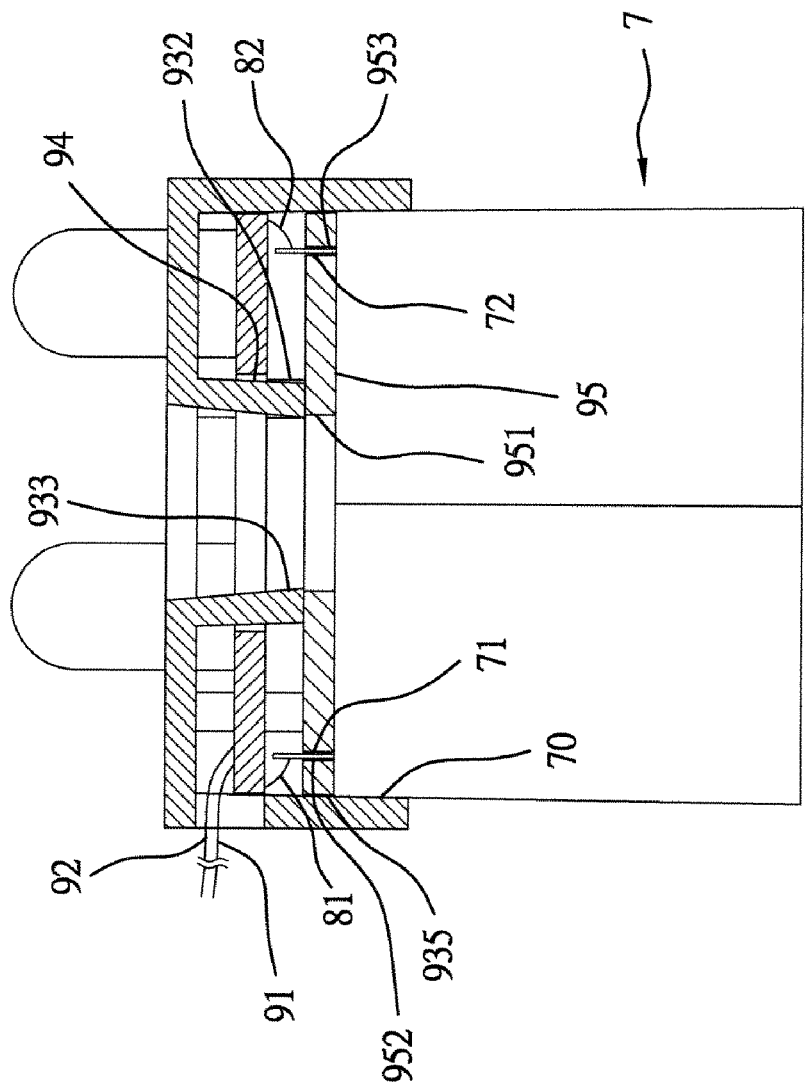
FIG. 7 is a schematic sectional view of a part of the present invention, showing the buzzer, the spacer plate and the LED circuit board mounted inside the cap.

Further, as shown in FIGS. 1 and 7, the lead wire 81 at the positive terminal 71 of the buzzer 7 is electrically connected with the positive pole of a LED circuit board 9 that carries a plurality of LEDs (light emitting diodes) 90. The LED circuit board 9 has a positive pole lead wire 91 electrically connected to the bottom end 312 of the reverse light terminal 31. The lead wire 82 at the negative terminal 72 of the buzzer 7 is electrically with the negative pole of the LED circuit board 9. The LED circuit board 9 has its negative pole electrically connected to the bottom end 341 of the grounding terminal 34 by a negative pole lead wire 92. Therefore, when the reverse light of the vehicle and at the buzzer 7 is turned on, the LED circuit board 9 is driven to flash the LEDs (light emitting diodes) 90, giving a visual warning signal.

Further, the buzzer 7 and the LED circuit board 9 are mounted in a cap 93 prior to installation in the accommodation chamber 20. Referring to FIGS. 1 and 7, the cap 93 comprises a peripheral wall 931 tightly fitted into the accommodation chamber 20, a center opening 933, a tubular inside flange 932 suspending inside the peripheral wall 931 and surrounding the center opening 933, a plurality of through holes 934 spaced around the center opening 933, and an inside locating groove 935. The LED circuit board 9 is mounted inside the cap 93 to insert the LEDs (light emitting diodes) 90 into the through holes 934, having a center mounting hole 94 that receives the tubular inside flange 932 tightly. Further, a spacer plate 95 is mounted inside the cap 93 and set between the LED circuit board 9 and the buzzer 7, having a center hole 951, and two through holes 952 and 953 for the passing of the positive terminal 71 and negative terminal 72 of the buzzer 7. Further, the buzzer 7 has the peripheral wall 70 thereof press-fitted into the inside locating groove 935 of the cap 93.

Figure 8:
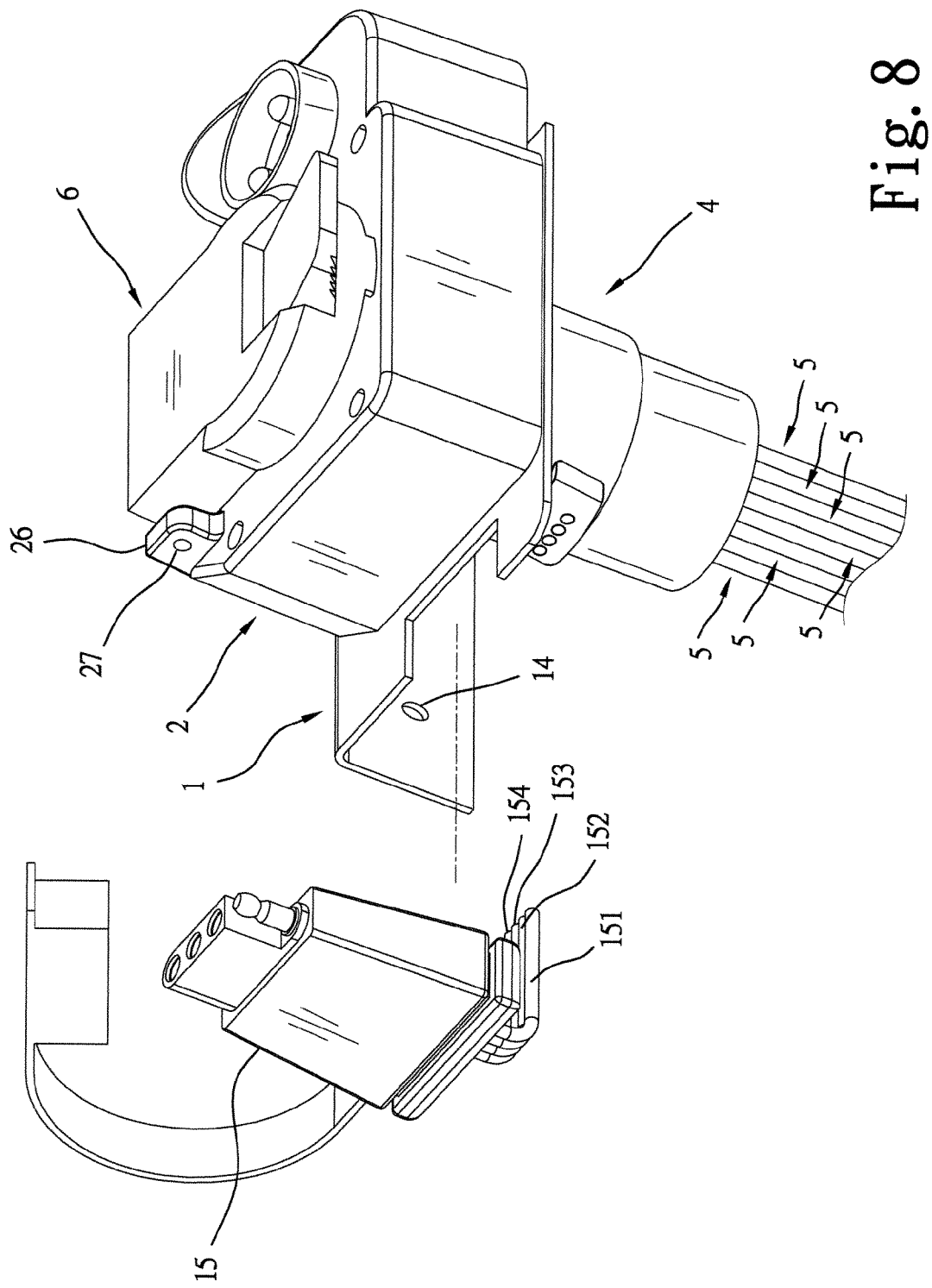
FIG. 8 is an elevational assembly view of the present invention, showing the front cover closed on the connector body.

Further, as shown in FIG. 8, an electrical connector 15 may be fastened to the bracket 1 of the female connector member for towing connector, having terminals 151, 152, 153 and 154 for the connection of electric circuit means.

As indicated above, the invention provides female connector member for towing connector, which has the following advantages:

1. By means of mounting a buzzer 7 in the accommodation chamber 20 of the connector body 2 and electrically connecting the positive terminal 71 and negative terminal 72 of the buzzer 7 to the reverse light terminal 31 and the grounding terminal 34, the buzzer 7 gives an audio warning signal when the towing vehicle is moving backwards, raising the safety level.

2. A LED circuit board 9 is mounted in the accommodation chamber 20 of the connector body 2 and electrically connected with the buzzer 7, and therefore the LEDs 90 of the LED circuit board 9 are driven to flash when the buzzer 7 is turned on to give an audio warning signal, enhancing the safety.

What is claimed is:

1. A female connector member for towing connector, comprising:
   a bracket, said bracket comprising an opening, a plurality of first mounting through holes, and a plurality of second mounting through holes for fastening to a rear bottom side of a towing vehicle by fastening members;
   a connector body fixedly fastened to the first mounting through holes of said bracket, said connector body comprising a plug hole for the connection of a male connector member for towing connector;
   a center insertion hole and a plurality of border insertion holes respectively disposed in communication with said plug hole, said center insertion hole receiving a reverse light terminal, said border insertion holes receiving a taillight terminal, a left turn signal light terminal, a grounding terminal, a stoplight terminal, a right turn signal light terminal and a battery terminal respectively, a plurality of lead wires respectively electrically connecting said reverse light terminal, said taillight terminal, said left turn signal light terminal, said grounding terminal, said stoplight terminal, said right turn signal light terminal and said battery terminal to the reverse light, taillight, left turn signal light, grounding circuit, stoplight, right turn signal light and 12V car battery of the towing vehicle to which said bracket is fastened;
   a plurality of mounting holes respectively fastened to the first mounting through holes of said bracket;
   a pair of upright lugs;
   a back cover, said back cover comprising a plurality of mounting holes respectively fastened to the mounting through holes of said connector body by fastening members, and a plurality of insertion holes for the passing of the terminals of said connector body; and
   a front cover pivotally connected to the upright lugs of said connector body by a pivot pin,
   wherein said connector body further comprises an accommodation chamber that houses a buzzer, said buzzer comprising a positive terminal and a negative terminal respectively electrically connected to said reverse light terminal and said grounding terminal so that when the towing vehicle is moving backwards, the reverse light of the towing vehicle is turned on to give a visual warning signal, and at the same time said buzzer is driven to given an audio warning signal.

2. The female connector member for towing connector as claimed in claim 1, further comprising a LED circuit board mounted inside said accommodation chamber of said connector body above said buzzer and electrically connected to the positive terminal and negative terminal of said buzzer, said LED circuit board comprising a plurality of light emitting diodes, said LED circuit board controlling said light emitting diodes to flash when said buzzer is driven to buzz.

3. The female connector member for towing connector as claimed in claim 1, further comprising a cap capped on said accommodation chamber of said connector body to house said buzzer and said LED circuit board, and a spacer plate mounted inside said cap and set between said LED circuit board and said buzzer, said cap comprising a peripheral wall tightly fitted into said accommodation chamber of said connector body, a center opening, a tubular inside flange suspending inside said peripheral wall and surrounding the center opening and press-fitted into a center hole of said LED circuit board, a plurality of through holes spaced around the center opening for receiving the light emitting diodes of said LED circuit board, and an inside locating groove, which receives an upper part of said buzzer tightly; said spacer plate comprising two through holes for the passing of the positive terminal and negative terminal of said buzzer.

* * * * *